Oct. 11, 1955     C. A. WATERS     2,720,002

POWER DRIVEN HOG SCRAPER

Filed Feb. 5, 1953     2 Sheets-Sheet 1

INVENTOR.
Cecil A. Waters
BY
Atty.

Oct. 11, 1955  C. A. WATERS  2,720,002
POWER DRIVEN HOG SCRAPER
Filed Feb. 5, 1953  2 Sheets-Sheet 2
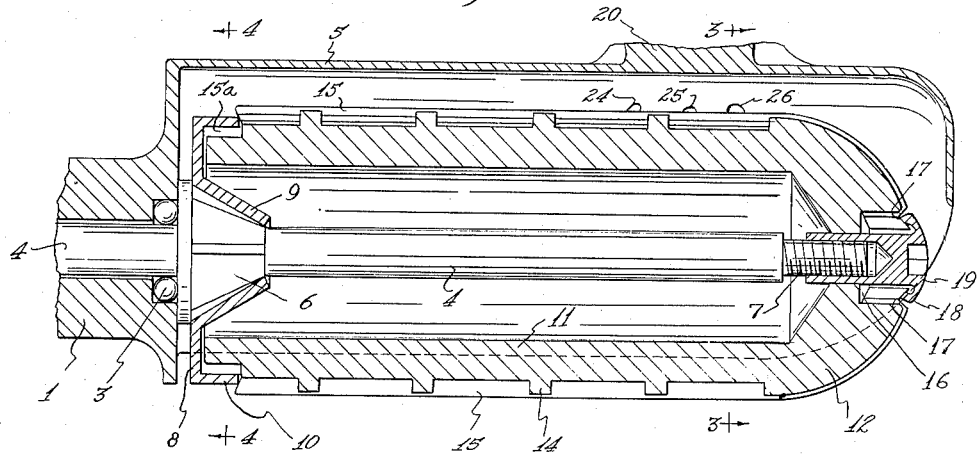
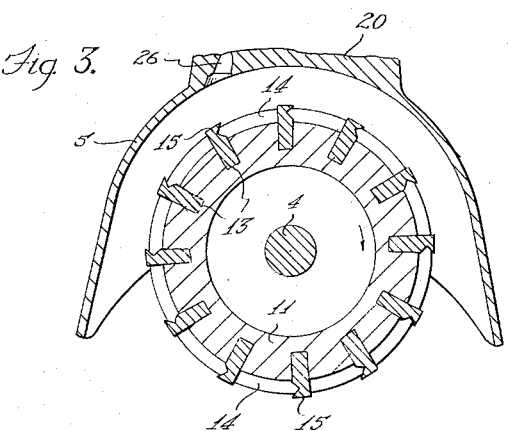
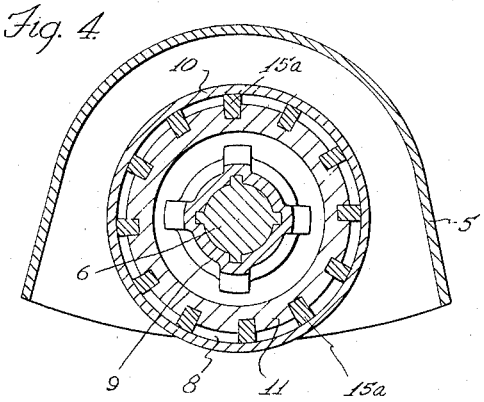
INVENTOR.
Cecil A. Waters
BY
*Fred Wells*
Atty.

United States Patent Office 2,720,002
Patented Oct. 11, 1955

2,720,002

POWER DRIVEN HOG SCRAPER

Cecil A. Waters, Manhattan, Mont.

Application February 5, 1953, Serial No. 335,207

5 Claims. (Cl. 17—18)

This invention relates to a power driven hog scraper which is adapted to be used in the removal of hairs and cleaning of the skin of the hog after it is slaughtered. In the cleaning of the skin of the animal after it is slaughtered and scalded to loosen the hairs, the problem is to remove surplus hairs, and other materials that remain on the skin, without cutting or disfiguring the skin.

My invention comprises a rotating cylindrical cutter head with a rounded free end combined with a cover that is open at one side and at the end and provided with fluid spray nozzles to direct fluid under pressure against the cutters of the cutter head as they are moving away from the skin.

The cutters of the cylindrical head are blades extending the length of the cylindrical head and around the rounded end. They have the advancing faces under-cut. The skin is held away from too deep engagement with the cutters by circumferentially extending ribs between the blades and the head of the rounded end is raised between blades.

The nature and advantages of my invention will be more fully explained in the following description, reference being made to the accompanying drawings which illustrate a preferred form of the invention.

In the drawings:

Figure 2 is an enlarged sectional view taken lengthwise through the scraper;

Figure 3 is a sectional view taken on the line 3—3 of Figure 2;

Figure 4 is a sectional view taken on the line 4—4 of Figure 2;

Figure 1:
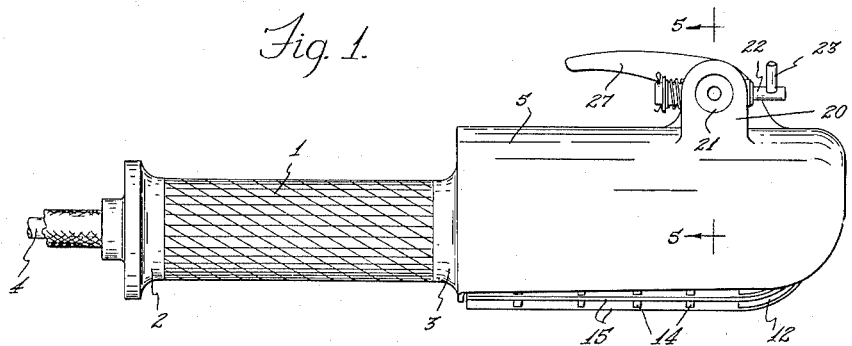
Figure 1 is a side view of a scrapper made according to my invention.
Figure 5:
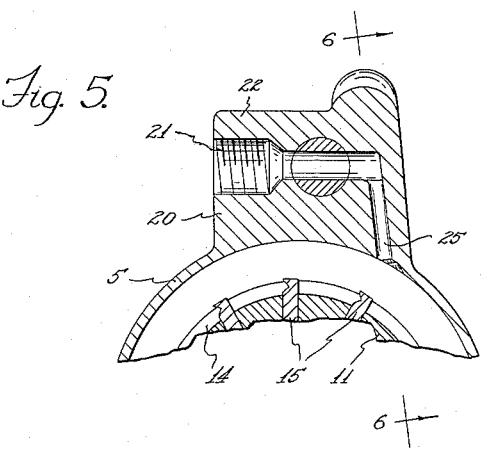
Figure 5 is an enlarged fragmentary sectional view taken on the line 5—5 of Figure 1.
Figure 6:
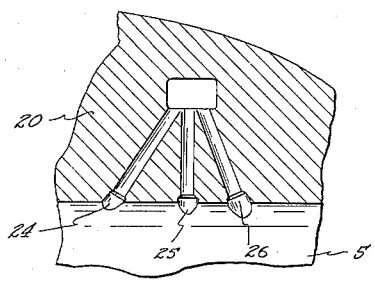
Figure 6 is a fragmentary sectional view taken on the line 6—6 of Figure 5.

Referring now to the drawings the scraper is shown as mounted on a handle 1 which provides bearings 2 and 3 for a drive shaft 4. A cover 5 is formed integral with the handle 1. The shaft 4 extends from the handle 1 beneath the cover 5 and has a splined hub 6 thereon adjacent to the bearing 3. The end of the shaft 4 is reduced and threaded at 7.

A flanged ring 8 has a portion 9 embossed to fit the splined hub 6. The ring 8 also has a rim flange 10. A hollow cutter head 11 abuts the flanged ring 8. The head 11 has a rounded end 12. Between the end 12 and the flange 8, the head is cylindrical. The head 11 has grooves 13 extending from the flange 8 to the other end. The grooves 13 curve around the rounded end 12. The head has several circumferentially extending ribs 14 thereon. The ribs 14 and the rounded end are raised about the same amount with respect to the cylinder surface.

A plurality of undercut cutter blades 15 are seated in the grooves 13. These blades curve inward around the end 12 into a recess 16 in the rounded end 12. The blades 15 have notches 17 at their inner ends to receive the flange 18 of a cap screw 19 that is threaded on the reduced end 7 of the shaft 4. The other ends of the blades 15 have cut down portions 15a that extend beneath the flange 10 of the ring 8. The blades 15 are held tightly on the head 11 by the ring 8 and the cap screw 19.

The cover 5 has a valve body 20 formed thereon. The valve body 20 has an inlet 21 threaded to attach a tube to supply fluid, such as warm or hot water under pressure. A valve 22 has a handle 23. The valve outlet is three nozzles 24, 25 and 26 which extend toward the head 11 and diverge from each other to spread the fluid lengthwise of the head.

The nozzles 24, 25 and 26 direct the fluid against the undercut advancing faces of the blades 15 so that the blades are cleansed on their advancing faces and also carry fluid around with them to the skin. In this way the head scrapes and washes the skin in one operation. The ribs 14 and the rounded end 12 are set in very slightly from the cutting edges of the blades to keep the skin from pushing in between blades and being lacerated. This slight set in also allows for sharpening the blades 15. The spaces between the blades and ribs are recesses to receive the foreign matter, hairs, etc. removed from the skin until they are washed away by the fluid from the nozzles 24, 25 and 26. The undercut advancing faces of the blades break up the fluid into fine spray.

The valve body 20 carries a hook 27 for convenience in hanging up the scraper when it is not in use. The entire construction is such that the scraper is convenient to use. The undercut blades 15 are easily sharpened to keep the scraper at best efficiency. When the blades are worn down to the level of the ribs 14 and the end 12, they can be removed by taking off the cap screw 19 and new blades can be inserted. Fluid forced from the fluid nozzles 24, 25 and 26 against the advancing undercut faces of the blades 15 keeps the blades and the interior of the cover 5 clean. The ribs 14 and the rounded end 12 on the head 11, keep the skin from catching between the blades where it could be damaged by the blades.

I claim:

1. A scraper for removing hair, etc., from a hog carcass, comprising a drive shaft, a handle having bearings for said shaft, a cover extending from one end of the handle, the shaft projecting from the handle beneath the cover to a point adjacent to the free end of the cover, a hollow cutter head around the shaft beneath the cover, a flanged ring non-rotatably mounted on the shaft adjacent to the handle, a cap screw on the free end of the shaft, the head having longitudinal grooves in its exterior surface, under-cut blades seated in said grooves and confined at their ends by the flanged ring and the cap screw to secure the head and blades to the shaft, and the head having a plurality of spaced circumferentially running ribs bridging the spaces between the cutter blades to keep skin of the carcass from folding in between blades.

2. A scraper for removing hair, etc., from a hog carcass, comprising a drive shaft, a handle having bearings for said shaft, a cover extending from one end of the handle, the shaft projecting from the handle beneath the cover to a point adjacent to the free end of the cover, a hollow cutter head around the shaft beneath the cover, a flange ring non-rotatably mounted on the shaft adjacent to the handle, a cap screw on the free end of the shaft, the head having longitudinal grooves in its exterior surface, under-cut blades seated in said grooves and confined at their ends by the flanged ring and the cap screw to secure the head and blades to the shaft, the cover having fluid nozzles positioned to direct fluid against the advancing faces of the cutter blades, and the head having a plurality of spaced circumferentially running ribs bridging the spaces between the cutter blades to keep skin of the carcass from folding in between blades.

3. A scraper for removing hair, etc., from a hog carcass, comprising a drive shaft, a handle having bearings for said shaft, a cover extending from one end of the handle, the shaft projecting from the handle beneath the cover to a point adjacent to the free end of the cover, a hollow cutter head around the shaft beneath the cover, a flanged ring non-rotatably mounted on the shaft adjacent to the handle, a cap screw on the free end of the shaft, the head having longitudinal grooves in its exterior surface, under-cut blades seated in said grooves and confined at their ends by the flanged ring and the cap screw to secure the head and blades to the shaft, a valve body on the cover having a fluid inlet, a valve therein, nozzle outlets from the valve body to the interior of the cover positioned to direct fluid against the advancing faces of the cutter blades, and the head having a plurality of spaced circumferentially running ribs bridging the spaces between the cutter blades to keep skin of the carcass from folding in between blades.

4. A scraper for removing hair, etc., from a hog carcass, comprising a drive shaft, a handle having bearings for said shaft, a cover extending from one end of the handle, the shaft projecting from the handle beneath the cover to a point adjacent to the free end of the cover, a hollow cutter head around the shaft beneath the cover, having a rounded end at the free end of the shaft, a flanged ring non-rotatably mounted on the shaft adjacent to the handle, a cap screw on the free end of the shaft, the head having longitudinal grooves in its exterior surface, under-cut blades seated in said grooves and confined at their ends by the flanged ring and the cap screw to secure the head and blades to the shaft, and the head having a plurality of spaced circumferentially running ribs raised above the adjacent head surface to cover the major portion of the under-cut face of each blade, thereby bridging the spaces between the cutter blades to keep skin of the carcass from folding in between the blades, the rounded end raised above the adjacent head surface to cover the major portion of the under-cut face of each blade, thereby also bridging the space between blades to prevent gouging of the skin by the blades at said end.

5. In a scraper for removing hair, etc. from a hog carcass, a drive shaft, a handle having bearings for the shaft, a cutter head mounted on the shaft adjacent to said handle, the head comprising a cylindrical body having its end remote from the handle rounded, and having spaced apart circumferentially running ribs thereon, the body having longitudinal grooves in the outer surface extending from the tip of said rounded end to the end of the body adjacent to said handle, blades seated in said grooves and extending radially outward from the head, said blades having grooves in their advancing faces outwardly of the main surface of said cylindrical body and extending to the outer advancing edges of the blades, and the ribs and rounded end of the head covering the major portions of said grooves where they meet the blades and bridging the spaces between blades to keep skin from folding in between the blades.

References Cited in the file of this patent

UNITED STATES PATENTS

| | | |
|---|---|---|
| 1,324,581 | Boesch et al. | Dec. 9, 1919 |
| 1,642,802 | Barry | Sept. 20, 1927 |
| 2,481,182 | Waters | Sept. 6, 1949 |

FOREIGN PATENTS

| | | |
|---|---|---|
| 753,355 | France | Aug. 7, 1933 |

OTHER REFERENCES

Meat, May 1951, page 76.